United States Patent Office 3,455,746
Patented July 15, 1969

3,455,746
BONDING OF OXYMETHYLENE POLYMER TO ALUMINUM
Arthur Kong, Kearny, N.J., assignor to Celanese Corporation, New York, N.Y., a corporation of Delaware
No Drawing. Filed Apr. 26, 1966, Ser. No. 545,268
Int. Cl. C23f 7/14, 7/26
U.S. Cl. 148—6.15                                10 Claims

ABSTRACT OF THE DISCLOSURE

A method for coating aluminum substrates with oxymethylene polymers is disclosed and claimed which calls for the initial step of modifying the surface of the aluminum by contacting it with an aqueous solution made up of a mineral acid e.g., hydrochloric acid, and an inorganic agent e.g., zinc phosphate and zinc chromate, and subsequently raising the temperature of the modified aluminum surface and thereafter contacting it with the oxymethylene polymer. The claimed process produces aluminum coated products that may be used in an environment which previously prevented the use of aluminum alone.

---

The present invention relates broadly to the coating art, and is more particularly concerned with a novel method of coating aluminum articles with adherent protective coatings of oxymethylene polymer compositions.

When an article formed of aluminum is coated directly with an oxymethylene polymer by a powder fusion technique or by a fluidized bed technique, it has been found on some occasions that it is difficult to initially obtain adequate adherence between the polymer coating and the aluminum object being coated. It has also been found that the degree of adherence heretofore achieved between an aluminum article and a polyoxymethylene polymer has precluded the use of the article in certain use areas. The quality of the bond between the article and polymer coating becomes of prime importance when one desires to employ the coated article in an environment which is detrimental to an exposed aluminum surface, but not to the protective oxymethylene polymer coating. The bond strength is also important when the uniform physical appearance of the coated article is considered vital to the user.

Commonly assigned Ser. Nos. 187,184, filed Apr. 13, 1962, and 450,498, filed Apr. 23, 1965, disclose novel processes for the coating of metallic and non-metallic base materials with an oxymethylene polymer employing fluidized bed conditions.

My copending application Ser. No. 436,665, filed Mar. 2, 1965, and commonly assigned Ser. No. 386,398, filed July 30, 1964, disclose novel methods for accomplishing improved bonds between a base article and an oxymethylene polymer.

It is an object of the present invention to provide an improved method for efficiently accomplishing a tightly adherent permanent bond between an aluminum article and an oxymethylene polymer coating.

Other objects as well as the scope, nature, and utilization of the invention will become apparent from the following description and appended claims.

It has been discovered that an improved method of coating an aluminum article with an oxymethylene polymer comprises initially modifying the surface characteristics of the article to render the surface receptive to a tightly adherent coating by contacting the surface with a mineral acid which contains dissolved therein at least one inorganic agent such as a phosphate containing compound or a hexavalent chromium containing compound, and contacting the modified surface with an oxymethylene polymer in particulate form to provide an adherent coating thereon.

As used in the specification and claims the term "aluminum article" is defined to encompass in addition essentially pure aluminum articles those articles formed from aluminum base alloys which are capable of withstanding the temperatures necessary in order to form satisfactory oxymethylene polymer coatings according to the invention. Examples of such alloys include aluminum alloyed with 5 to 12 percent silicon, nickel, magnesium, tin, chromium and titanium. It is essential that the melting point of the article be above that of the oxymethylene polymer used to produce the coating.

Oxymethylene polymers, having recurring —OCH$_2$— units directly attached to each other, have long been known. Such polymers may be prepared by the polymerization of formaldehyde or trioxane, which is a cyclic trimer of formaldehyde. High molecular weight oxymethylene polymers vary in thermal stability and, in accordance with a preferred embodiment of this invention, the polymer which is stabilized is an oxymethylene polymer containing carbon-to-carbon single bonds in the main polymer chain.

In a particularly preferred embodiment of my invention, the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is those which are free of interfering functional groups and which will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

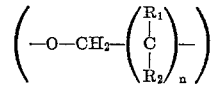

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxyethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane or formaldehyde with a cyclic ether having the structure

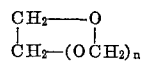

where $n$ is an integer from zero to 2.

Examples of preferred polymers include copolymers of trioxane and cyclic ethers containing at least two adjacent carbon atoms such as the copolymers disclosed in U.S. Patent No. 3,027,352 to Walling et al. which patent is assigned to the same assignee as the subject application.

Among the specific cyclic ethers which may be used are ethylene oxide; 1,3-dioxolane; 1,3,5-trioxepane; 1,4-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

Other oxymethylene polymers and methods of preparation therefor are disclosed by Sittig in Hydrocarbon Processing and Petroleum Refiner, 41(11), pp. 131–170 (November 1962) and by Kern et al. in Angewandte Chemie 73(6), pp. 177–186 (Mar. 21, 1961), including polymers containing repeating carbon-to-carbon single bonds in the polymer chain by copolymerizing trioxane with cyclic ethers such as dioxane, lactones such as betapropiolactone, anhydrides such as cyclic adipic anhydride, and ethylenically unsaturated compounds such as styrene, vinyl methyl ketone and acrolein.

As used in the specification and claims of the instant application, the term "oxymethylene" includes substituted oxymethylene, where the substituents are inert with respect to the reactions in question, that is, the substituents are free of interfering functional groups and will not introduce undesirable reactions.

As used in the specification and claims, the term "copolymer" means polymers having two or more monomeric groups, including terpolymers and higher polymers. Suitable terpolymers include those disclosed in U.S. patent application Ser. No. 229,715, filed Oct. 10, 1962 in the names W. E. Heinz and F. B. McAndrew, which is also commonly assigned.

Oxymethylene polymers, suitable for use in this invention also include oxymethylene homopolymers, such as those made from trioxane or formaldehyde. In certain instances it may be desirable to "end-cap" the polymer molecules by such methods as esterification or etherification in order to increase their thermal stability.

The preferred coating polymers according to the invention have an inherent viscosity of at least one, when measured at 60° C. in a 0.1 weight percent solution in p-chlorophenol containing 2 weight percent of $\alpha$-pinene.

The preferred polymers which are used as coating materials in accordance with this invention are thermoplastic materials having a melting point of at least 150° C. and are normally millable at a temperature of about 200° C. They have an average molecular weight of at least 10,000. These polymers have a high thermal stability before the treatment disclosed herein, however, this stability is markedly improved by such treatment. For example, if an oxymethylene polymer which is chemically stabilized as described below, is placed in an open vessel in a circulating air oven at a temperature of about 230° C., and its weight loss is measured without removal of the sample from the oven, it will have a thermal degradation rate of less than 1.0 weight percent/minute for the first 45 minutes and, in preferred instances, less than 0.1 weight percent/minute for the same period of time.

In a preferred embodiment of this invention it is generally desirable to incorporate one or more thermal stabilizers into the copolymer in order to bring its thermal degradation rate even lower. The proportion of stabilizer incorporated depends upon the specific stabilizer used. A proportion between about 0.05 and 10 weight percent, based on the weight of the polymer, has been found suitable for most stabilizers.

One suitable stabilizer system is a combination of (1) an antioxidant ingredient, such as phenolic antioxidant and most suitably a substituted bisphenol, and (2) an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol).

Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, melamine, cyanoguanidine, compounds having tertiary amine and terminal amide groups, compounds having amidine groups, cycloaliphatic amine compounds, and aliphatic acylureas.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, when in finely divided dry state, may be blended into finely divided polymer in any suitable blending apparatus.

One suitable method of incorporation of the chemical stabilizers is by blending a dry solid stabilizer into the plastic polymer, while the latter is being kneaded on heated rolls or through an extruder.

Prior to the surface modification of an aluminum article according to the invention it is recommended for best results that the surface be essentially free of foreign matter, such as grease or dirt. Standard procedures may be utilized to remove adhering foreign matter, such as degreasing or alkaline cleansing techniques.

The exact mechanism whereby the surface characteristics of an aluminum article are initially modified according to the invention is considered complex and incapable of simple explanation. It is believed, however, that the mineral acid containing at least one dissolved inorganic agent is capable of facilitating a permanent bond between the aluminum article and the oxymethylene polymer which has both metchanical and chemical attributes. It is further believed that the mineral acid is capable of etching the aluminum article in such a manner that at least a portion of the inorganic agent or its reaction product is precipitated upon the etched aluminum surface and is available to facilitate a permanent bond during the subsequent oxymethylene polymer coating step of the present invention.

The surface characteristics of the aluminum article are modified by contacting at least a portion of the article with a mineral acid containing a dissolved inorganic agent for a sufficient period of time so that the surface is rendered receptive to a tightly adherent coating of oxymethylene polymer. The time required to satisfactorily modify the surface characteristics may vary widely and is dependent upon the concentrations selected for the various components as well as the temperature of the mineral acid solution. A modifying period of at least about 1 minute and preferably about 3 to 10 minutes has been found to be particularly satisfactory in most instances. It has been found that a bond of maximum strength is produced if a rough rather than a finely etched surface is produced. Conditions which produce an extremely fast etch tend to yield an extremely finely etched surface and are preferably avoided. In a preferred embodiment of the invention the article is contacted with the mineral acid solution by immersion. Various spray etching techniques may also be employed.

The particularly preferred mineral acids which are employed according to the invention are aqueous solutions of hydrochloric or phosphoric acid. Such acids may be present in a concentration range of about 5 to 50 percent by weight of the total solution. A particularly preferred concentration range is about 10 to 30 percent by weight of the total solution. By raising the temperature of the mineral acid solution above room temperature, i.e. to about 30° C. to 70° C., particularly satisfactory results are obtained.

Illustrative examples of inorganic agents which are dissolved in a mineral acid according to the invention include acid soluble phosphate containing compounds such as zinc phosphate, iron phosphate, and magnesium phosphate; and acid soluble hexavalent chromium containing compounds such as zinc chromate, zinc dichromate, and chromic acid. If desired a commercially available product marketed as "Chromicoat" by Oakite Products, Inc. of New York, N.Y., may be utilized as the source of the inorganic agent. The particularly preferred inorganic agents are zinc phosphate and zinc chromate. It is recommended that the inorganic agents be present in a concentration of at least about 0.05 percent by weight of the total solution. Concentrations of slightly lesser and considerably greater magnitude (10 percent by weight of the total solution) may be resorted to, however, as will be apparent to those skilled in the art. In most instances a concentration of about 0.05 to about 3 percent by weight of the total solution is preferred.

In a preferred embodiment of the invention the surface modified aluminum article is briefly rinsed prior to coating with an oxymethylene polymer. A simple cold water rinse may be utilized.

Once the surface of the aluminum article or a portion thereof has been modified in accordance with the present invention, it may next be coated by any one of a variety of powder fusion techniques whereby particulate oxymethylene polymer is fused tightly to the modified surface to form an essentially uniform coating thereon. For instance, various powder spraying techniques may be utilized.

In accordance with one embodiment of this invention, the part or article to be coated is maintained at an elevated temperature in a zone wherein finely divided particles of an oxymethylene polymer are maintained in a fluidized state with the zone-containing particles being known as a fluidized bed. A fluidized bed is a mass of solid particles which exhibits the liquid-like characteristics of mobility, hydrostatic pressure and an observable upper free surface or powdery zone across which a marked change in concentration of particles occurs. The fluidized bed may be termed "a dense phase" having an upper free surface. The fluidized bed technique is well known to those skilled in the art and is disclosed for example, in U.S. Patent Nos. 2,974,060 and 3,032,816. Also, commonly assigned Ser. Nos. 187,184, filed Apr. 13, 1962, and 450,498, filed Apr. 23, 1965, referred to above disclose the application of novel fluidized bed processes for coating articles with oxymethylene polymers.

In general, the fluidized bed is formed by introducing an ascending current of gas into the particulate coating material under pressure with the bed being maintained in the fluidized state by controlling the flow of the gas. An article to be coated is immersed at least partially into the fluidized bed of the coating material. In order to provide adhesion the article to be coated is usually heated either before or during the immersion process. An elevated temperature of the article of between about 175° C. and about 260° C. is preferred. The particulate coating material upon contact with the heated article thus becomes fused thereon. When it is desired to further increase a thickness of oxymethylene polymer coating it is possible to remove the article from the bed, again heat the article to an elevated temperature, and again immerse the article in the fluidized bed. The polymer particles are suitably ground to a size predominantly between about 40 to 325 mesh (420 to 44 microns), and preferably between 80 and 200 mesh (177 to 74 microns).

Unless stated otherwise in the following illustrative examples, oxymethylene polymers were used which were prepared by polymerizing trioxane and ethylene oxide, which polymers contain approximately 2 weight percent of randomly distributed oxyethylene groups in the oxymethylene chains. The polymers had been stabilized prior to molding by hydrolytic degradation of their unstable polymer ends as disclosed in commonly assigned Ser. No. 102,097, filed Apr. 11, 1961 by Frank M. Berardinelli and by the incorporation of a scission inhibitor combination comprising about 0.08 percent cyanoguanidine and about 0.02 percent melamine, and 0.5 percent of a suitable phenloic stabilizer such as 2,2′ methylene-bis (4-methyl-6-tertiary butyl phenol) or 2,2′ methylene-bis (4-ethyl-6-tertiary butyl phenol).

Example I

A two inch section of aluminum pipe having a diameter of 1½ inches was degreased and subsequently immersed for about 5 minutes in an aqueous surface modifying solution comprising about 15 percent hydrochloric acid by weight of the total solution and having about 2 percent by weight of the total solution of zinc phosphate dissolved therein. During the immersion step the temperature of the surface modifying solution was maintained at about 40° C. The aluminum pipe section was removed from the modifying solution and rinsed with water at about room temperature for about one minute.

A fluidized bed of oxymethylene polymer particles of approximately 80 to 200 mesh, was prepared using air at room temperature as the gaseous medium. The previously surface modified aluminum pipe was preheated in an oven to a temperature of about 220° C. and then immersed in the fluidized bed for a period of approximately 10 seconds. Upon removal from the fluidized bed the pipe was found to have been uniformly coated with a tightly adherent coating of approximately 15 mils thickness. The article was next postheated for approximately 5 minutes at about 220° C.

Example II

A section of aluminum pipe as defined in Example I was immersed for about 5 minutes in an aqueous surface modifying solution comprising about 15 percent hydrochloric acid by weight of the total solution, and having about 2 percent zinc chromate by weight of the total solution dissolved therein. Following the procedure set forth in Example I a tightly adherent coating of oxymethylene polymer was produced upon the section of pipe.

Example III

A section of aluminum pipe as defined in Example I was immersed for about 5 minutes in an aqueous solution of 15 percent hydrochloric acid by weight of the total solution, and having about 1 percent chromic acid by weight of the total solution dissolved therein. Following the procedure set forth in Example I a tightly adherent coating of oxymethylene polymer was produced upon the pipe section.

Example IV

A section of aluminum pipe as defined in Example I was immersed for about 5 minutes in an aqueous solution of 30 percent phosphoric acid by weight of the total solution, and having about 2 percent zinc phosphate by weight of the total solution dissolved therein. Following the procedure set forth in Example I a tightly adherent coating of oxymethylene polymer was produced upon the pipe section.

Example V

The procedure set forth in Example I was repeated with the exception that the oxymethylene polymer was applied to the aluminum pipe section by a powder spraying process, rather than by the fluidized bed technique. The pipe was preheated to about 220° C. One side of the pipe was sprayed with oxymethylene polymer powder of about 80 to 200 mesh, heated a second time in an oven to about 220° C., and the opposite side thereof was sprayed with additional polymer. The article was postheated at about 220° C. for about 10 minutes. The coating which measured about 10 mils was found to be tightly adherent.

In order to further test the bond strength of the coatings produced in Examples I-V the aluminum pipe was immersed for 3000 hours in each of the following solutions:

(a) pH 4 solutions at room temperature and 58° C.
(b) pH 11 solutions at room temperature and 58° C.
(c) Five percent by weight sodium chloride solution at 58° C.
(d) Boiling water.

It was found that none of the test environments had any effect on the oxymethylene polymer-aluminum bond. While it was found that the pH 4 solution at 58° C. attacked somewhat the polymer coating, the adhesion of the remaining coating proved to be excellent.

The embodiments of the invention in which an exclusive property or privilege is claimed are defined as follows:

1. A method of coating an aluminum article with an oxymethylene polymer, which comprises initially modifying the surface characteristics of said article to render the surface receptive to a tightly adherent coating of said polymer by contacting said surface with an aqueous solution, said aqueous solution comprising from about 5 to about 50 weight percent of a mineral acid, selected from the group consisting of hydrochloric acid and phosphoric acid, and from about 0.05 to about 10 weight percent of at least one inorganic agent selected from the group consisting of zinc phosphate, iron phosphate, magnesium phosphate, zinc chromate, zinc dichromate and chromic acid, and contacting at least a portion of said modified surface at an elevated temperature above the crystalline melting point of said polymer with said polymer in particulate form to provide an adherent coating thereon.

2. A method of coating an aluminum article according to claim 1 in which the oxymethylene polymer is a copolymer having a melting point above 150° C. with the copolymer having at least one chain containing recurring oxymethylene units interspersed with —OR— groups in the main polymer chain, where R is a divalent radical containing at least two carbon atoms directly linked to each other and positioned in the chain between the two valences, with any substituents on said R radical being inert.

3. A method of coating an aluminum article according to claim 1 wherein the inorganic agent is zinc phosphate or zinc chromate.

4. A method of coating an aluminum article according to claim 1 in which the modified surface is contacted with said polymer in particulate form present as a fluidized bed.

5. A method of coating an aluminum article with an oxymethylene polymer, which comprises initially modifying the surface characteristics of said articles to render the surface receptive to a lightly adherent coating of said polymer by immersing said surface in an aqueous solution, said aqueous solution comprising from about 5 to about 50 weight percent of a mineral acid selected from the group consisting of hydrochloric acid and phosphoric acid and from about 0.05 to about 10 weight percent of an inorganic zinc compound selected from the group consisting of zinc phosphate and zinc chromate, providing a fluidized bed of oxymethylene polymer particles, and immersing at least a portion of said article having modified surface characteristics and at an elevated temperature above the crystalline melting point of said polymer in said fluidized bed of oxymethylene polymer to provide an adherent coating thereon.

6. A method of coating an aluminum article according to claim 5 in which the solution of an inorganic acid containing a dissolved inorganic zinc compound is elevated above room temperature when the article is immersed in said solution.

7. A method of coating an aluminum article according to claim 5 in which said elevated temperature is between about 175° C. and about 260° C.

8. A method of coating an aluminum article according to claim 5 in which the polymer particles are predominantly between about 40 mesh and 325 mesh.

9. A mehtod of coating an aluminum article according to claim 5 in which the oxymethylene polymer is a copolymer having a melting point above 150° C. with the copolymer having at least one chain containing recurring oxymethylene units interspersed with —OR— groups in the main polymer chain, where R is a divalet radical containing at least two carbon atoms directly linked to each other and positioned in the chain between the two valences with any substituents on said R radical being inert.

10. A method of coating an aluminum article with an oxymethylene copolymer having a melting point above about 150° C., with the copolymer having at least one chain containing recurring oxymethylene units interspersed with —OR— groups in the main polymer chain where R is a divalent radical containing at least two carbon atoms directly linked to each other and positioned in the chain between the two valences with any substituents on said R radical being inert, which comprises modifying the surface characteristics of said article to render the surface receptive to a tighly adherent coating of said polymer by immersing said surface for at least about one minute in an aqueous solution at an elevated temperature of about 30° C. to 70° C. of a mineral acid present in a concentration of about 10 to 30 percent by weight of the total solution selected from the group consisting of hydrochloric acid and phosphoric acid containing dissolved therein an inorganic zinc compound present in a concentration of about 0.05 to about 3 percent by weight of the total solution selected from the group consisting of zinc phosphate and zinc chromate; rinsing said article; providing a fluidized bed of particles of said oxymethylene copolymer, said particles being predominantly between about 40 mesh and 325 mesh; and immersing at least a portion of said article in said fluidized bed of oxymethylene copolymer to provide an adherent coating of oxymethylene copolymer upon the modified surface immersed therein, said article being at an elevated temperature which is above the crystalline melting point of said copolymer and is between about 175° C. and about 260° C. during at least a portion of the step when immersed in the fluidized bed.

References Cited

UNITED STATES PATENTS

| 2,775,570 | 12/1956 | Barkdoll et al. | 117—161 X |
| 2,811,471 | 10/1957 | Hameyer | 148—6.27 X |
| 2,948,643 | 8/1960 | Pimbley | 148—6.2 X |
| 3,027,352 | 3/1962 | Walling et al. | 117—161 X |
| 3,122,525 | 2/1964 | Kern et al. | 117—161 X |
| 3,351,504 | 11/1967 | De Hart | 148—6.14 |

FOREIGN PATENTS 1,025,237  4/1966  Great Britain.

RALPH S. KENDALL, Primary Examiner

U.S. Cl. X.R.

117—21, 49, 132; 148—6.16, 6.2, 6.27